United States Patent
Kesani

(10) Patent No.: US 10,399,432 B2
(45) Date of Patent: Sep. 3, 2019

(54) DEFLECTOR ATTACHMENT

(71) Applicant: Caterpillar Inc., Peoria, IL (US)

(72) Inventor: Sharath Kesani, Springfield, IL (US)

(73) Assignee: Caterpillar Inc., Deerfield, IL (US)

( * ) Notice: Subject to any disclaimer, the term of this patent is extended or adjusted under 35 U.S.C. 154(b) by 193 days.

(21) Appl. No.: 15/624,759

(22) Filed: Jun. 16, 2017

(65) Prior Publication Data
US 2018/0361848 A1 Dec. 20, 2018

(51) Int. Cl.
*B62D 33/00* (2006.01)
*B60K 13/04* (2006.01)
*F01N 13/08* (2010.01)
*B60P 1/28* (2006.01)

(52) U.S. Cl.
CPC ............... *B60K 13/04* (2013.01); *B60P 1/28* (2013.01); *F01N 13/082* (2013.01); *B60Y 2200/142* (2013.01); *B60Y 2200/41* (2013.01); *F01N 2260/20* (2013.01); *F01N 2590/08* (2013.01)

(58) Field of Classification Search
CPC ........... B60K 13/04; B60P 1/28; F01N 13/082
USPC ............... 298/11, 12, 14, 17; 296/183.2
See application file for complete search history.

(56) References Cited

U.S. PATENT DOCUMENTS

| | | | | |
|---|---|---|---|---|
| 2,490,532 A * | 12/1949 | Maxon, Jr. | ................ | B60P 1/20 296/183.2 |
| 3,331,433 A * | 7/1967 | Hagberg | ............ | B60H 1/00014 165/51 |
| 6,481,785 B1 * | 11/2002 | Coleman | ................. | B60P 1/286 296/183.2 |
| 6,565,146 B2 * | 5/2003 | Fujan | ..................... | B60P 1/283 296/183.2 |
| 7,481,483 B2 * | 1/2009 | D'Amico | ................ | B60P 1/286 296/183.1 |
| 8,690,259 B2 | 4/2014 | Hagenbuch | | |
| 9,434,231 B2 * | 9/2016 | Hagenbuch | ............ | B60P 1/286 |
| 9,581,064 B2 | 2/2017 | Janssen et al. | | |
| 2002/0074848 A1 * | 6/2002 | Feuereisen Azocar | ...................... | B62D 33/02 298/24 |
| 2008/0099276 A1 | 5/2008 | Bach | | |
| 2009/0320458 A1 | 12/2009 | Errera et al. | | |
| 2012/0169109 A1 * | 7/2012 | Rivera | ..................... | B60P 1/286 298/1 H |
| 2013/0187435 A1 * | 7/2013 | Uranaka | ................. | B60K 13/04 298/17 R |
| 2015/0013329 A1 * | 1/2015 | Pennycuff | ............. | F02B 29/045 60/599 |

FOREIGN PATENT DOCUMENTS

JP 2011182699 9/2011

* cited by examiner

*Primary Examiner* — Toan C To

(57) ABSTRACT

A deflector attachment is adapted to surround an exhaust outlet provided in a dump body of the machine. The deflector attachment includes a plate member having a curved portion. Exhaust gases exiting the exhaust outlet are adapted to first impact the curved portion. The deflector attachment also includes a pair of side plates spaced apart by the plate member. The deflector attachment further includes an inclined deflecting plate extending between the pair of side plates. The plate member, the pair of side plates, and the inclined deflecting plate define a flow passage for smoothly diverting the exhaust gases exiting the exhaust outlet towards a central portion of the dump body.

20 Claims, 5 Drawing Sheets

DEFLECTOR ATTACHMENT

TECHNICAL FIELD

The present disclosure relates to a deflector attachment associated with an exhaust outlet of a machine.

BACKGROUND

Machines, such as mining trucks, are used for transportation of material from one place to another at a worksite. The machines include an engine for propulsion purposes and to power various other machine components. In some of these machines, exhaust gases from the engine are let out of the machine via an exhaust outlet provided in a dump body of the machine. In extreme cold conditions, exhaust smog coming out from the exhaust outlet of the dump body may accumulate and obstruct rear view of an operator of the machine, especially on left hand side of the machine where the operator is seated. The obstruction of the operator's view may hamper the operator's ability to safely operate the machine at the worksite, which is not desirable.

U.S. Published Application Number 2009/0320458 describes a system for deflecting a flow of exhaust gas that may include a tubular member configured to provide flow communication between a muffler and an exhaust gas exit. The system may further include a surface configured to at least partially divert a flow of exhaust gas from a first direction to a second direction generally orthogonal to the first direction. The system may also include at least one arm operably coupling the tubular member and the surface to one another.

SUMMARY OF THE DISCLOSURE

In one aspect of the present disclosure, a deflector attachment associated with a machine is provided. The deflector attachment is adapted to surround an exhaust outlet provided in a dump body of the machine. The deflector attachment includes a plate member having a curved portion. Exhaust gases exiting the exhaust outlet are adapted to first impact the curved portion. The deflector attachment also includes a pair of side plates spaced apart by the plate member. The deflector attachment further includes an inclined deflecting plate extending between the pair of side plates. The plate member, the pair of side plates, and the inclined deflecting plate define a flow passage for smoothly diverting the exhaust gases exiting the exhaust outlet towards a central portion of the dump body.

In another aspect of the present disclosure, a dump body associated with a machine is provided. The dump body includes a floor defining an exhaust outlet. The dump body also includes a front wall. The dump body further includes a pair of side walls. The floor, the front wall, and the pair of side walls are structured and arranged to define a material collection structure. The exhaust outlet is provided proximal to at least one of the pair of side walls. The dump body includes a deflector attachment coupled to the floor and adapted to surround the exhaust outlet. The deflector attachment includes a plate member including a curved portion. Exhaust gases exiting the exhaust outlet are adapted to first impact the curved portion. The deflector attachment also includes a pair of side plates spaced apart by the plate member. The deflector attachment further includes an inclined deflecting plate extending between the pair of side plate. The plate member, the pair of side plates, and the inclined deflecting plate define a flow passage for smoothly diverting the exhaust gases exiting the exhaust outlet towards a central portion of the dump body.

In yet another aspect of the present disclosure, a deflector attachment associated with a machine is provided. The deflector attachment is adapted to surround an exhaust outlet provided in a dump body of the machine. The deflector attachment includes a plate member including a curved portion. Exhaust gases exiting the exhaust outlet are adapted to first impact the curved portion. The deflector attachment also includes a pair of side plates spaced apart by the plate member. The plate member and the pair of side plates define a flow passage for smoothly diverting the exhaust gases exiting the exhaust outlet towards a central portion of the dump body.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
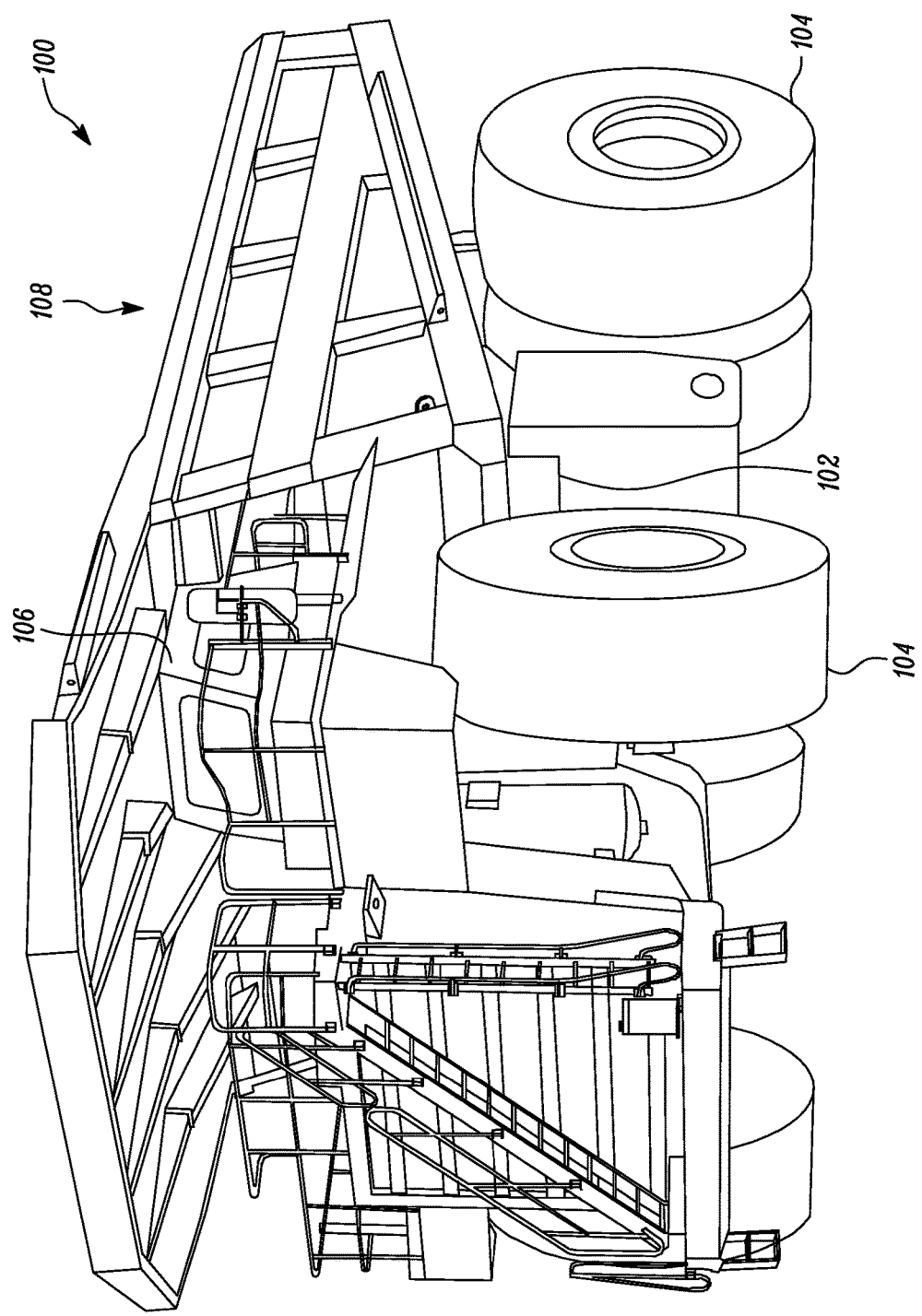
FIG. 1 is a perspective view of an exemplary machine, according to one embodiment of the present disclosure.

FIG. 1 is a perspective view of a machine 100, according to one embodiment of the present disclosure. In the illustrated embodiment, the machine 100 is embodied as a mining truck operating at a mine site. Alternatively, the machine 100 may embody any other type of truck known in the art. Further, the machine 100 can operate at any other worksite, such as, a landfill, a quarry, a construction site, and the like. The machine 100 may perform operations associated with an industry such as mining, construction, farming, transportation, or any other industry known in the art.

The machine 100 includes a chassis 102. The chassis 102 rotatably supports a set of ground engaging members 104 each of which is embodied as a wheel in the illustrated embodiment of FIG. 1. The ground engaging members 104 rotate about their respective axes thereby propelling the machine 100 on a ground surface. Alternatively, it can be contemplated to embody the set of ground engaging members 104 in the form of tracks (not shown) such that the tracks propel the machine 100.

The machine 100 includes an engine (not shown) for providing propulsion power to the machine 100. The engine may be an internal combustion engine such as a compression ignition diesel engine, without any limitations. A cab 106 is mounted to the chassis 102. When the machine 100 is embodied as a manual or a semi-autonomous machine, an operator of the machine 100 is seated within the cab 106 to perform one or more machine operations.

The machine 100 further includes a dump body 108 for receiving material, such as, soil, sand, asphalt, miscellaneous debris, and the like, and to carry such material during travel of the machine 100 from one location to another location. The dump body 108 is coupled with the chassis 102, and may be tilted between a lowered position, as shown, and a lifted position, to dump material from the dump body 108 in a conventional manner. More particularly, the dump body 108 can be lifted by a hydraulic system (not shown) of the machine so as to eject the material therefrom at an appropriate time. Thereafter, the dump body 108 can be lowered back, so that additional material may be loaded into the dump body 108.

Figure 2:
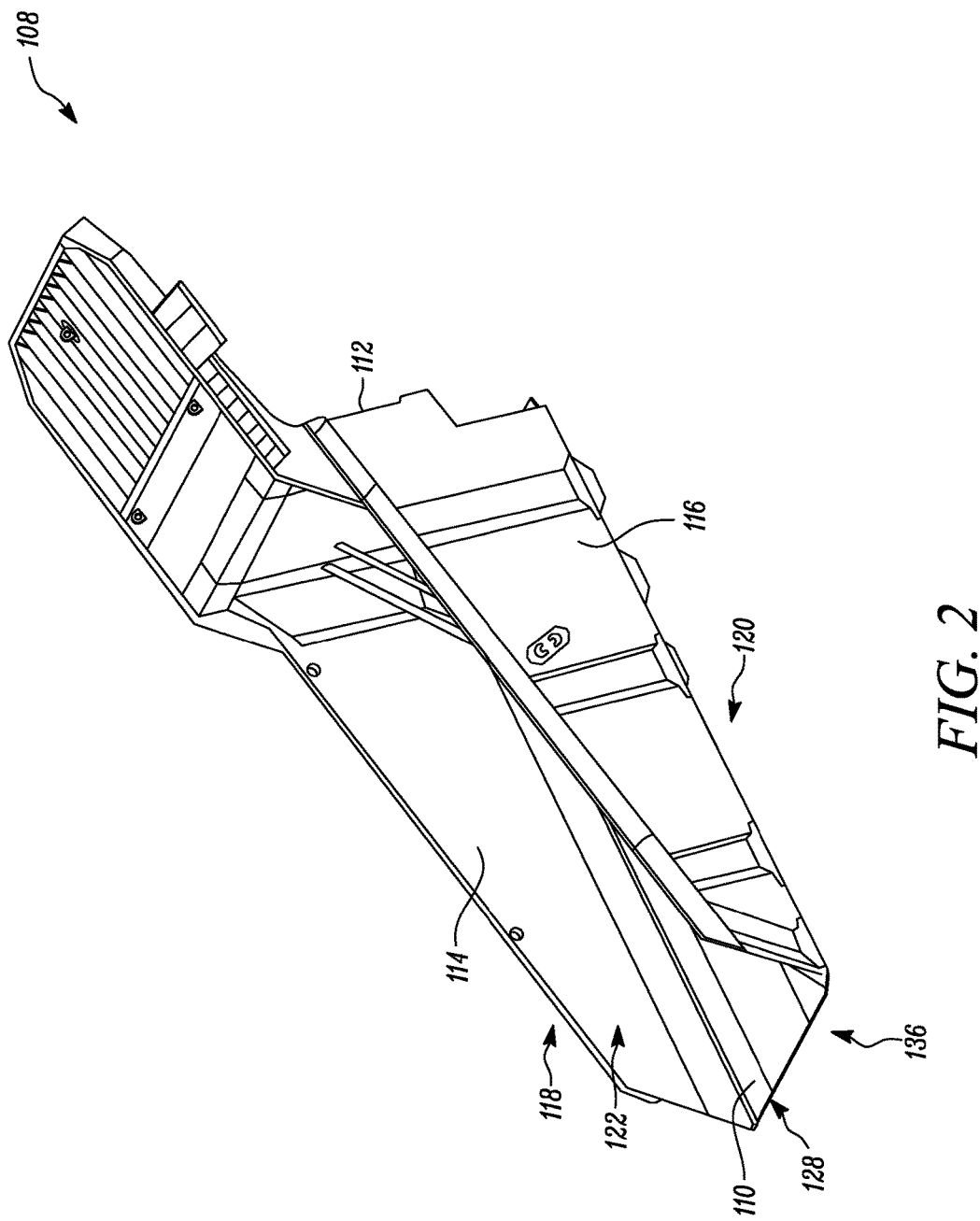
FIG. 2 is a perspective view of a dump body associated with the machine of FIG. 1.

Referring to FIG. 2, the dump body 108 includes a floor 110, a front wall 112, and a pair of side walls 114, 116. The pair of side walls 114, 116 is defined at a left hand side 118 and a right hand side 120 of the machine 100, respectively. The floor 110, the front wall 112, and the pair of side walls 114, 116 are structured and arranged to define a material collection structure 122. The material collection structure 122 receives and holds the material therein.

Further, the front wall 112 defines an exhaust inlet (not shown). The exhaust inlet is in fluid communication with an exhaust pipe (not shown) of the engine to receive exhaust gases therefrom. The exhaust inlet is in fluid communication with exhaust channels (not shown) defined in the front wall 112 and the floor 110. Some of these exhaust channels are defined in one or more ribs associated with the front wall 112 and/or the floor 110.

Figure 3:
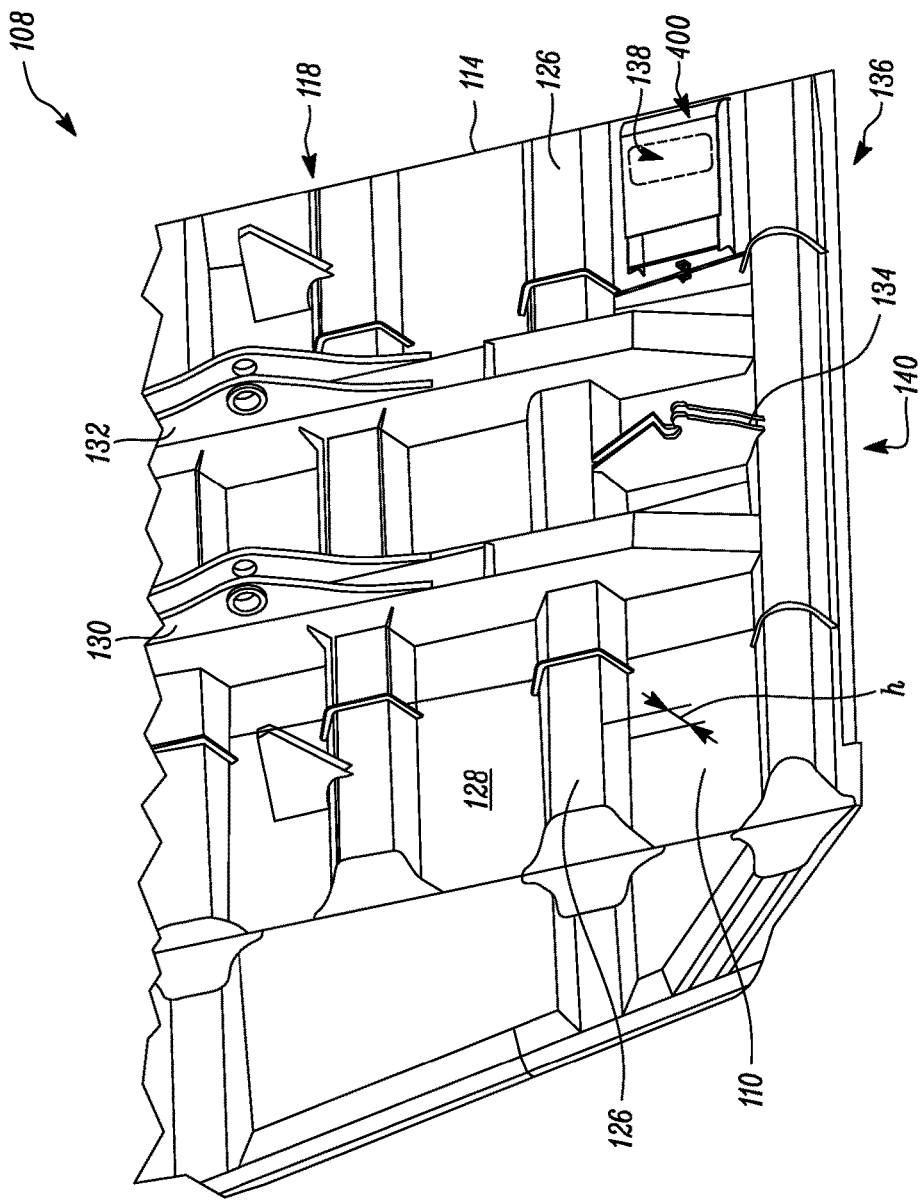
FIG. 3 is a perspective view of a floor of the dump body of FIG. 2.

The floor 110 of the dump body 108 may generally include a rectangular shape or a trapezoidal shape, and forms a base/bed of the dump body 108. Referring now to FIG. 3, the floor 110 includes a number of ribs 126 provided on an outer surface 128 of the floor 110 for improving strength and rigidity of the dump body 108. The outer surface 128 also includes a first bracket 130 and a second bracket 132 that connects the dump body 108 with respective pivot axis on the chassis 102. The outer surface 128 may further include hoist brackets (not shown) provided proximal to a front end of the dump body 108. The hoist brackets couple with hydraulic cylinders associated with the hydraulic system of the machine 100 for raising and lowering the dump body 108. In one example, a third bracket 134 is coupled to the outer surface 128. The third bracket 134 allows mounting of an image capturing device (not shown) at a rear end 136 of the dump body 108.

The floor 110 also includes an exhaust outlet 138. The exhaust outlet 138 is defined proximal to the left hand side 118 of the machine 100. Alternatively, the exhaust outlet 138 may be defined proximal to the right hand side 120 of the machine 100. In the illustrated embodiment, the exhaust outlet 138 is defined proximal to the rear end 136 of the dump body 108. Further, the exhaust outlet 138 is proximal to the side wall 114. The exhaust outlet 138 includes a generally rectangular shape with curved corners. Alternatively, the exhaust outlet 138 may include any other shape, for example, the exhaust outlet 138 may be elliptical or circular in shape. It should be noted that a single exhaust outlet 138 is illustrated in the accompanying figures. However, a number of the exhaust outlets may vary based on engine exhaust back-pressure system requirements. For example, the floor 110 may include two exhaust outlets or four exhaust outlets, without any limitations.

Referring to FIG. 3, the present disclosure relates to a deflector attachment 400. The deflector attachment 400 surrounds the exhaust outlet 138 defined in the floor 110. The deflector attachment 400 is coupled to the outer surface 128 of the floor 110. Further, a height "H" of the deflector attachment 400 is less than a height "h" of the ribs 126 of the floor 110, so that the deflector attachment 400 does not contact and interfere with machine components or berm on the ground surface present underneath the dump body 108 when the dump body 108 is in the lowered position. The accompanying figure illustrates a single deflector attachment 400 associated with the exhaust outlet 138. However, a number of the deflector attachments may vary based on the number of the exhaust outlets. Accordingly, the machine 100 may include multiple deflector attachments based on the number of exhaust outlets, without any limitations.

Figure 4:
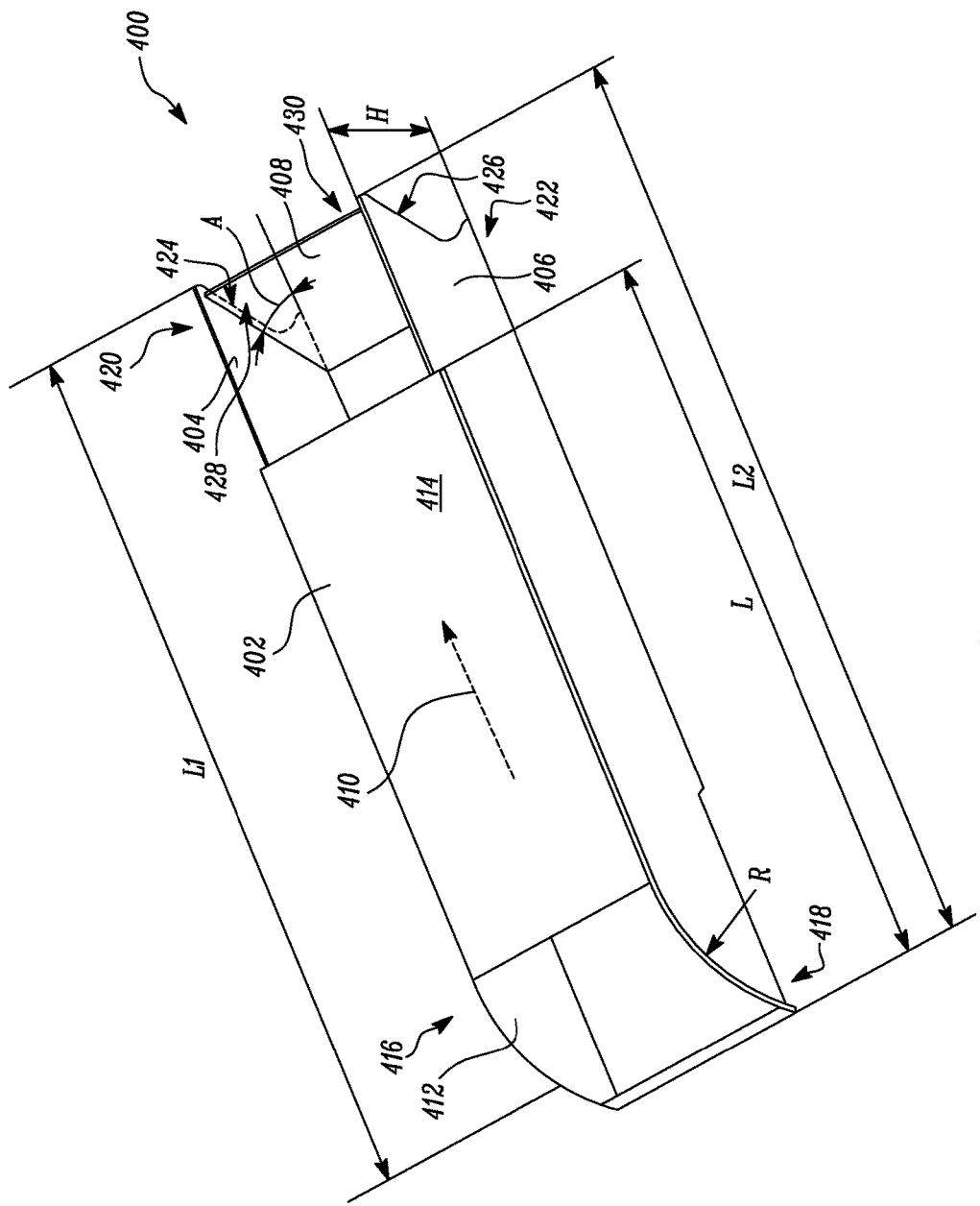
FIG. 4 is a perspective view of a deflector attachment, according to one embodiment of the present disclosure.

FIG. 4 is a perspective view of a deflector attachment 400, according to one embodiment of the present disclosure. The deflector attachment 400 includes a plate member 402, a pair of side plates 404, 406, and an inclined deflecting plate 408. Each of the plate member 402, the pair of side plates 404, 406, and the inclined deflecting plate 408 define a flow passage 410 for smoothly diverting the exhaust gases exiting the exhaust outlet 138 (see FIG. 3) towards a central portion 140 (shown in FIG. 3) of the dump body 108.

Further, the plate member 402 includes a curved portion 412 and a generally planar portion 414. The planar portion 414 of the plate member 402 is parallel to the outer surface 128, and is vertically spaced apart from the outer surface 128 (see FIG. 3). The deflector attachment 400 is coupled to the outer surface 128 such that the exhaust gases exiting the exhaust outlet 138 first impact the curved portion 412, and then flow along the flow passage 410 before being let out into the atmosphere. It should be noted that a direction of flow of the exhaust gases along the flow passage 410 is generally orthogonal to a direction of exit of the exhaust gases from the exhaust outlet 138, and the curved portion 412 is adapted to smoothly transition the direction of the exhaust gases based on the impact of the exhaust gases on the curved portion 412.

A radius "R" of the curved portion 412 lies between 275 mm and 325 mm. In one example, the radius "R" of the curved portion 412 is approximately equal to 300 mm. It should be noted that a value of the radius "R" of the curved portion 412 mentioned herein is exemplary in nature, and the value may vary based on factors including, but not limited to, a flow pattern of the exhaust gases, a dimension, a location, and the shape of the exhaust outlet 138, and engine back-pressure.

The deflector attachment 400 also includes the pair of side plates 404, 406, namely a first side plate 404 and a second side plate 406. The first and second side plates 404, 406 are spaced apart from each other by the plate member 402. It should be further noted that the first and second side plates 404, 406 have equal lengths "L1", "L2". Further, a length "L" of the plate member 402 is less than the respective lengths "L1", "L2" of the first and second side plates 404, 406. The first and second side plates 404, 406 extend perpendicularly from the outer surface 128. A first end 416, 418 of each of the first and second side plates 404, 406 includes a curved profile confirming with the curved portion 412 of the plate member 402. Further, a second end 420, 422 of the each of the first and second side plates 404, 406 includes a cut-out portion 424, 426, respectively, to improve structural flexibility of the deflector attachment 400; thereby improving weld life at termination ends when the machine 100 undergoes severe ground induced racking events.

The deflector attachment 400 also includes the inclined deflecting plate 408. The inclined deflecting plate 408 smoothly transitions the exhaust gases impacting an inner surface 428 of the inclined deflecting plate 408 in a downward direction so that the exhaust gases do not interfere with a field of view of the image capturing device that is positioned at the rear end 136 (see FIG. 2). It should be noted that the inner surface 428 makes an obtuse angle with respect to the outer surface 128.

The inclined deflecting plate 408 extends between the first and second side plates 404, 406. A width of the inclined deflecting plate 408 is equal to a distance between inner surfaces of the first and second side plates 404, 406. The inclined deflecting plate 408 is inclined with respect to the floor 110 (see FIG. 3) such that an angle of inclination "A" of the inclined deflecting plate 408 lies between 42 degrees and 48 degrees. In one example, the angle of inclination "A" of the inclined deflecting plate 408 is approximately equal to 45 degrees. The term "angle of inclination" used herein is defined as an acute angle between an outer surface 430 of the inclined deflecting plate 408 and the outer surface 128. It should be noted that a value of the angle of inclination "A" mentioned herein is exemplary in nature, and the value may vary based on system requirements.

Figure 5:
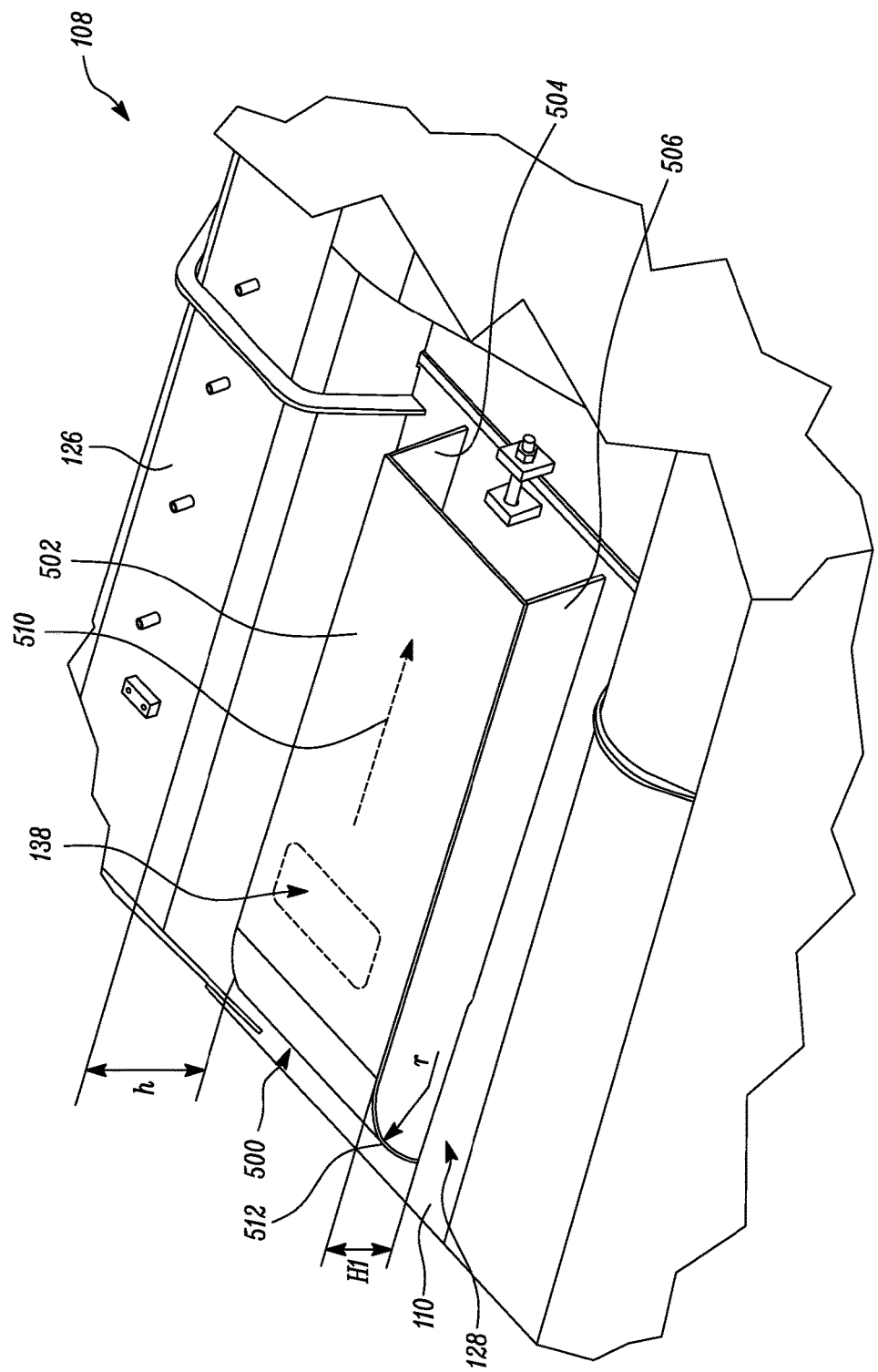
FIG. 5 is a perspective view of a deflector attachment coupled to the floor of the dump body, according to another embodiment of the present disclosure.

FIG. 5 illustrates another embodiment of a deflector attachment 500. The deflector attachment 500 includes a plate member 502 and a pair of side plates 504, 506, namely a first side plate 504 and a second side plate 506. The plate member 502 and the pair of side plates 504, 506 define a flow passage 510 for diverting the exhaust gases exiting the exhaust outlet 138 towards the central portion 140 (see FIG. 3) of the dump body 108. Further, a height "H1" of the deflector attachment 500 is less than the height "h" of the ribs 126 of the floor 110, so that the deflector attachment 500 does not contact and interfere with machine components or berm on the ground surface present underneath the dump body 108 when the dump body 108 is in the lowered position.

The plate member 402 includes a curved portion 512 such that the exhaust gases exiting the exhaust outlet 138 first impact the curved portion 512, to smoothly transition the exhaust gases along the flow passage 510 before being let out into the atmosphere. A value of a radius "r" of the curved portion 412 is similar to the value of the radius "R" of the curved portion 412 explained with reference to FIG. 4.

Further, the first side plate 504 and the second side plate 506 are spaced apart from each other by the plate member 502 and respective weld sizes on either side along outer surfaces. It should be further noted that the first and second side plates 504, 506 have equal lengths. Further, a length of the plate member 502 is approximately equal to the lengths of the first and second side plates 504, 506, respectively.

Referring to FIGS. 4 and 5, the deflector attachments 400, 500 can be coupled to the outer surface 128 of the floor 110 by welding. Alternatively, any other joining method, such as, brazing or soldering may be used to couple the respective deflector attachment 400, 500 with the outer surface 128, without any limitations. In some examples, adhesives or mechanical fasteners may be used to couple the respective deflector attachment 400, 500 with the outer surface 128.

In one example, the deflector attachments 400, 500 are made of a metal. For example, the deflector attachments 400, 500 are made of steel, without any limitations. Further, the deflector attachments 400, 500 may be embodied as a unitary component. Alternatively, various components of the deflector attachments 400, 500 may be manufactured separately and assembled, for example by welding, to form the deflector attachments 400, 500, without any limitations.

INDUSTRIAL APPLICABILITY

The present disclosure relates to the deflector attachments 400, 500 associated with the machine 100. The deflector attachments 400, 500 allow the exhaust gases exiting the exhaust outlet 138 to be directed towards the central portion 140 of the dump body 108. As the exhaust gases are directed towards the central portion 140 and not towards the left hand side 118 of the machine 100 at which the operator is seated, the operator can have an unobstructed view of a rear side of the machine 100, thereby improving operator safety. Also, when the machine 100 is embodied as a right hand drive machine or depending on a mine profile setup, the exhaust outlet 138 and hence the deflector attachment 400, 500 may be located proximal to the right hand side 120 of the machine 100. Accordingly, the deflector attachment 400, 500 will ensure that the exhaust gases are not directed towards the right hand side 120 of the machine 100, thereby allowing the operator to view the rear side of the machine 100 without any obstructions.

Further, design and dimensions of the deflector attachments 400, 500 are decided such that the engine backpressure lies within operational limits. Also, the components of the deflector attachments 400, 500 are simple to design and manufacture, and are cost effective. The deflector attachments 400, 500 can be easily installed on the machine 100 in field by customers of the machine 100.

In one example, the deflector attachment 400 shown in FIGS. 3 and 4 is advantageous when the rear end 136 of the dump body 108 includes the image capturing device. More particularly, the inclined deflecting plate 408 of the deflector attachment 400 ensures that the exhaust gases do not directly interfere with the field of view of the image capturing device. Further, the deflector attachment 500 shown in FIG. 5 can be used when no image capturing device or any other sensor is mounted proximal to the rear end 136 of the dump body 108.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A deflector attachment associated with a machine, wherein the deflector attachment is adapted to surround an exhaust outlet provided in a dump body of the machine, the deflector attachment comprising:
   a plate member including a curved portion, wherein exhaust gases exiting the exhaust outlet are adapted to first impact the curved portion;
   a pair of side plates spaced apart by the plate member; and
   an inclined deflecting plate extending between the pair of side plates, wherein the plate member, the pair of side plates, and the inclined deflecting plate define a flow passage for smoothly diverting the exhaust gases exiting the exhaust outlet towards a central portion of the dump body.

2. The deflector attachment of claim 1, wherein a radius of the curved portion lies between 275 mm and 325 mm.

3. The deflector attachment of claim 1, wherein the inclined deflecting plate is inclined with respect to a floor of the dump body such that an angle of inclination of the inclined deflecting plate lies between 42 degrees and 48 degrees.

4. The deflector attachment of claim 1, wherein the exhaust outlet is defined in a floor of the dump body and is proximal to a side wall of the dump body.

5. The deflector attachment of claim 4, wherein the deflector attachment is welded to the floor.

6. The deflector attachment of claim 4, wherein a height of the deflector attachment is less than a height of a rib of the floor.

7. The deflector attachment of claim 1, wherein each of the pair of side plates includes a cut-out portion.

8. The deflector attachment of claim 1, wherein the machine includes a plurality of deflector attachments.

9. A dump body associated with a machine, the dump body comprising:
   a floor defining an exhaust outlet;
   a front wall;
   a pair of side walls, wherein the floor, the front wall, and the pair of side walls are structured and arranged to define a material collection structure, the exhaust outlet being provided proximal to at least one of the pair of side walls; and
   a deflector attachment coupled to the floor and adapted to surround the exhaust outlet, the deflector attachment comprising:
      a plate member including a curved portion, wherein exhaust gases exiting the exhaust outlet are adapted to first impact the curved portion;
      a pair of side plates spaced apart by the plate member; and
      an inclined deflecting plate extending between the pair of side plates, wherein the plate member, the pair of side plates, and the inclined deflecting plate define a flow passage for smoothly diverting the exhaust gases exiting the exhaust outlet towards a central portion of the dump body.

10. The dump body of claim 9, wherein a radius of the curved portion lies between 275 mm and 325 mm.

11. The dump body of claim 9, wherein the inclined deflecting plate is inclined with respect to the floor such that an angle of inclination of the inclined deflecting plate lies between 42 degrees and 48 degrees.

12. The dump body of claim 9, wherein each of the pair of side plates includes a cut-out portion.

13. The dump body of claim 9, wherein a height of the deflector attachment is less than a height of a rib of the floor.

14. The dump body of claim 9, wherein the machine includes a plurality of deflector attachments.

15. A deflector attachment associated with a machine, wherein the deflector attachment is adapted to surround an exhaust outlet provided in a dump body of the machine, the deflector attachment comprising:
   a plate member including a curved portion, wherein exhaust gases exiting the exhaust outlet are adapted to first impact the curved portion;
   a pair of side plates spaced apart by the plate member; and
   an inclined deflecting plate extending between the pair of side plates, wherein the plate member and the pair of side plates define a flow passage for smoothly diverting the exhaust gases exiting the exhaust outlet towards a central portion of the dump body.

16. The deflector attachment of claim 15, wherein the inclined deflecting plate is inclined with respect to a floor of the dump body such that an angle of inclination of the inclined deflecting plate lies between 42 degrees and 48 degrees.

17. The deflector attachment of claim 15, wherein a radius of the curved portion lies between 275 mm and 325 mm.

18. The deflector attachment of claim 15, wherein each of the pair of side plates include a cut-out portion.

19. The deflector attachment of claim 15, wherein the deflector attachment is welded to a floor of the dump body.

20. The deflector attachment of claim 19, wherein a height of the deflector attachment is less than a height of a rib of the floor.

* * * * *